United States Patent [19]

Catallo et al.

[11] Patent Number: 5,699,838
[45] Date of Patent: Dec. 23, 1997

[54] APPARATUS FOR VACUUM IMPREGNATION OF A FLEXIBLE, HOLLOW TUBE

[75] Inventors: Giulio Catallo; Joe V. Cihlar, both of Houston; Maurice P. G. Lubbock, Sugarland, all of Tex.

[73] Assignee: Inliner, U.S.A., Houston, Tex.

[21] Appl. No.: 446,459

[22] Filed: May 22, 1995

[51] Int. Cl.⁶ .......................... B29C 63/26; B65B 31/04
[52] U.S. Cl. .............................. 141/65; 141/392; 264/269
[58] Field of Search .......................... 141/65, 7, 8, 114, 141/392; 239/436, 437, 438, 449; 222/486; 294/64.1; 279/3; 118/50, 75; 156/382, 286; 53/512; 264/269

[56] References Cited

U.S. PATENT DOCUMENTS

| | | |
|---|---|---|
| 130,303 | 8/1872 | Libby. |
| 143,661 | 10/1873 | Blake. |
| 154,725 | 9/1874 | Street. |
| 268,903 | 12/1882 | Johnson. |
| 470,669 | 3/1892 | Fitzpatrick. |
| 602,301 | 4/1898 | Bramlette. |
| 614,749 | 11/1898 | Pallas. |
| 680,974 | 8/1901 | Healey. |
| 738,289 | 9/1903 | Buckley. |
| 1,226,023 | 5/1917 | Smith. |
| 1,320,413 | 11/1919 | Reznicek. |
| 1,736,293 | 11/1929 | Van Denburg. |
| 2,090,851 | 8/1937 | Perkins. |
| 2,178,554 | 11/1939 | Bowie. |
| 2,195,222 | 3/1940 | Neumair. |
| 2,198,821 | 4/1940 | Jessup. |
| 2,285,370 | 6/1942 | Staelin. |
| 2,312,993 | 3/1943 | Stephens. |
| 2,326,827 | 8/1943 | Bynum. |
| 2,327,023 | 8/1943 | Danner. |
| 2,345,766 | 4/1944 | Miller. |

(List continued on next page.)

FOREIGN PATENT DOCUMENTS

| | | |
|---|---|---|
| 662560 | 10/1965 | Belgium. |
| 987576 | 4/1976 | Canada. |
| 1 134 290 | 10/1982 | Canada. |
| 1 195 128 | 10/1985 | Canada. |
| 1 217 416 | 2/1987 | Canada. |
| 1 250 737 | 3/1989 | Canada. |

(List continued on next page.)

OTHER PUBLICATIONS

Robert M. Hunter, Jerry E. Stephens "System for In Situ Rehabilitation of Pipelines", National Science Foundation, Jul. 1990.
ASTM C 581–87 entitled "Standard Practice for Determining Chemical Resistance of Thermosetting Resins Used in Glass–Fiber–Reinforced Structures Intended for Liquid Service", An American National Standard, Feb. 27, 1987.
"Replace Old Pipes Without Digging", Insituform of North America, Inc. brochure, 1985.
"The Competitive Alternative", Inliner U.S.A. brochure, before Feb. 21, 1995.
D. Ryhs–Jones, "Inflatable Terylene Reinforced Resin Pipe Linings", First International Conference on the Internal and External Protection of Pipes, Sep. 9, 1975.
World Wide Patents Computer Search, Jan. 16, 1996.
"Product Evaluation Fold and Formed Technology AM–Liner Ex–Method Nupipe U–Liner", American Consulting Engineers, Inc., Oct. 17, 1995.
Multiple Cup Process.
Multiple Needle Process.

*Primary Examiner*—Steven D. Maki
*Attorney, Agent, or Firm*—Tobor & Goldstein, L.L.P.

[57] ABSTRACT

An apparatus and method for removing air from a tube to improve the impregnation of the tube with a curable resin or other viscous fluid used in cured-in-place pipe rehabilitation. Also, a perforated needle for use in vacuum impregnation and a method of evacuating air from a flexible tube, particularly a lining tube used for rehabilitation of underground conduits.

9 Claims, 2 Drawing Sheets

U.S. PATENT DOCUMENTS

| | | | |
|---|---|---|---|
| 2,352,768 | 7/1944 | Brend . | |
| 2,354,399 | 7/1944 | Noble . | |
| 2,575,353 | 11/1951 | MacEvoy . | |
| 2,595,408 | 5/1952 | Ouest . | |
| 2,622,327 | 12/1952 | Halonen . | |
| 2,632,205 | 3/1953 | Harris . | |
| 2,697,585 | 12/1954 | Chaney et al. . | |
| 2,770,950 | 11/1956 | Collins . | |
| 2,794,758 | 6/1957 | Harper et al. . | |
| 2,910,042 | 10/1959 | Gallmeyer et al. . | |
| 2,987,768 | 6/1961 | Given . | |
| 2,993,338 | 7/1961 | Wilsted | 239/437 |
| 3,028,284 | 4/1962 | Reeves . | |
| 3,037,228 | 6/1962 | Cummings . | |
| 3,061,496 | 10/1962 | Meyer . | |
| 3,080,269 | 3/1963 | Pollock et al. . | |
| 3,122,786 | 3/1964 | Huisman . | |
| 3,132,062 | 5/1964 | Lang et al. . | |
| 3,175,392 | 3/1965 | Tharalson et al. . | |
| 3,175,590 | 3/1965 | Belknap | 141/8 |
| 3,179,551 | 4/1965 | Dudas . | |
| 3,312,256 | 4/1967 | Reisinger | 141/65 |
| 3,333,311 | 8/1967 | Matheny et al. . | |
| 3,340,115 | 9/1967 | Rubenstein . | |
| 3,376,180 | 4/1968 | Larson et al. . | |
| 3,376,181 | 4/1968 | Larson et al. . | |
| 3,511,734 | 5/1970 | Darrow . | |
| 3,560,295 | 2/1971 | Kimbrell et al. . | |
| 3,583,169 | 6/1971 | Morgan . | |
| 3,603,096 | 9/1971 | Wells . | |
| 3,628,576 | 12/1971 | Owen | 141/65 |
| 3,666,586 | 5/1972 | Lacey . | |
| 3,720,557 | 3/1973 | Longoni et al. . | |
| 3,753,766 | 8/1973 | Brown et al. . | |
| 3,834,421 | 9/1974 | Daley . | |
| 3,895,604 | 7/1975 | Ryan . | |
| 3,927,464 | 12/1975 | Wallsten . | |
| 3,940,942 | 3/1976 | Gower . | |
| 3,996,967 | 12/1976 | Takada . | |
| 4,009,063 | 2/1977 | Wood . | |
| 4,064,211 | 12/1977 | Wood . | |
| 4,127,430 | 11/1978 | Davis . | |
| 4,135,958 | 1/1979 | Wood . | |
| 4,182,262 | 1/1980 | Everson et al. . | |
| 4,197,908 | 4/1980 | Davis et al. . | |
| 4,207,130 | 6/1980 | Barber . | |
| 4,233,101 | 11/1980 | Scragg et al. . | |
| 4,247,345 | 1/1981 | Kadija et al. . | |
| 4,308,824 | 1/1982 | Muta et al. . | |
| 4,327,132 | 4/1982 | Shinno . | |
| 4,329,937 | 5/1982 | Holland . | |
| 4,366,012 | 12/1982 | Wood . | |
| 4,371,569 | 2/1983 | Muta et al. . | |
| 4,373,554 | 2/1983 | Cook . | |
| 4,385,885 | 5/1983 | Wood . | |
| 4,386,628 | 6/1983 | Stanley . | |
| 4,390,574 | 6/1983 | Wood . | |
| 4,401,696 | 8/1983 | Wood . | |
| 4,419,163 | 12/1983 | Yamamoto et al. . | |
| 4,434,115 | 2/1984 | Chick . | |
| 4,439,469 | 3/1984 | Wood . | |
| 4,442,891 | 4/1984 | Wood . | |
| 4,443,498 | 4/1984 | Shinno . | |
| 4,446,181 | 5/1984 | Wood . | |
| 4,456,401 | 6/1984 | Williams . | |
| 4,478,661 | 10/1984 | Lewis . | |
| 4,484,602 | 11/1984 | Guthrie . | |
| 4,492,095 | 1/1985 | Brister . | |
| 4,496,499 | 1/1985 | Brittain et al. . | |
| 4,505,613 | 3/1985 | Koga . | |
| 4,508,582 | 4/1985 | Fink . | |
| 4,529,008 | 7/1985 | Appleton . | |
| 4,548,783 | 10/1985 | Dalke et al. . | |
| 4,568,581 | 2/1986 | Peoples, Jr. . | |
| 4,577,388 | 3/1986 | Wood . | |
| 4,581,085 | 4/1986 | Wood . | |
| 4,581,247 | 4/1986 | Wood . | |
| 4,585,033 | 4/1986 | Westman . | |
| 4,593,721 | 6/1986 | Klenk et al. . | |
| 4,600,615 | 7/1986 | Hyodo et al. . | |
| 4,602,974 | 7/1986 | Wood et al. . | |
| 4,604,152 | 8/1986 | Liukko . | |
| 4,622,196 | 11/1986 | Wood . | |
| 4,625,766 | 12/1986 | Dohlen et al. . | |
| 4,626,133 | 12/1986 | Waring . | |
| 4,630,676 | 12/1986 | Long, Jr. . | |
| 4,637,588 | 1/1987 | Wilhelm et al. . | |
| 4,637,754 | 1/1987 | Wood . | |
| 4,640,313 | 2/1987 | Stanley . | |
| 4,649,004 | 3/1987 | Nohara et al. . | |
| 4,655,638 | 4/1987 | Waring . | |
| 4,668,125 | 5/1987 | Long, Jr. . | |
| 4,672,832 | 6/1987 | Merker . | |
| 4,677,472 | 6/1987 | Wood . | |
| 4,680,066 | 7/1987 | Wood . | |
| 4,681,783 | 7/1987 | Hyodo et al. . | |
| 4,684,419 | 8/1987 | Agosta . | |
| 4,684,556 | 8/1987 | Ohtsuga et al. . | |
| 4,685,983 | 8/1987 | Long, Jr. . | |
| 4,701,988 | 10/1987 | Wood . | |
| 4,710,337 | 12/1987 | Nordström . | |
| 4,714,095 | 12/1987 | Müller et al. . | |
| 4,723,579 | 2/1988 | Hyodo et al. . | |
| 4,733,699 | 3/1988 | Hata . | |
| 4,738,565 | 4/1988 | Streatfield et al. . | |
| 4,752,431 | 6/1988 | Knowles . | |
| 4,752,511 | 6/1988 | Driver . | |
| 4,754,781 | 7/1988 | Jan de Putter . | |
| 4,758,454 | 7/1988 | Wood . | |
| 4,759,656 | 7/1988 | Wilson . | |
| 4,770,562 | 9/1988 | Müller et al. . | |
| 4,773,450 | 9/1988 | Stanley . | |
| 4,776,370 | 10/1988 | Long, Jr. . | |
| 4,777,984 | 10/1988 | Storah . | |
| 4,778,553 | 10/1988 | Wood . | |
| 4,786,345 | 11/1988 | Wood . | |
| 4,790,975 | 12/1988 | Järvenkylä et al. . | |
| 4,808,098 | 2/1989 | Chan et al. . | |
| 4,810,453 | 3/1989 | Clarke et al. . | |
| 4,819,721 | 4/1989 | Long, Jr. . | |
| 4,836,715 | 6/1989 | Wood . | |
| 4,867,921 | 9/1989 | Steketee, Jr. . | |
| 4,871,413 | 10/1989 | Hyodo et al. . | |
| 4,877,665 | 10/1989 | Higuchi et al. . | |
| 4,883,557 | 11/1989 | Morinaga et al. . | |
| 4,897,135 | 1/1990 | Aylor, Jr. et al. . | |
| 4,901,424 | 2/1990 | Menendez . | |
| 4,907,624 | 3/1990 | Jonasson . | |
| 4,925,381 | 5/1990 | Aoki et al. . | |
| 4,933,134 | 6/1990 | Järvenkylä et al. . | |
| 4,950,356 | 8/1990 | Grace . | |
| 4,950,446 | 8/1990 | Kinumoto et al. . | |
| 4,956,038 | 9/1990 | Morinaga et al. . | |
| 4,959,110 | 9/1990 | Russell . | |
| 4,972,880 | 11/1990 | Strand . | |
| 4,976,290 | 12/1990 | Gelin et al. . | |
| 4,980,116 | 12/1990 | Driver . | |
| 4,985,196 | 1/1991 | LeDoux et al. . | |
| 4,986,951 | 1/1991 | Ledoux et al. . | |
| 4,991,006 | 2/1991 | Wood . | |
| 4,995,761 | 2/1991 | Barton . | |
| 5,018,545 | 5/1991 | Wells . | |

| | | |
|---|---|---|
| 5,019,417 | 5/1991 | Northcutt . |
| 5,027,895 | 7/1991 | Barton . |
| 5,029,615 | 7/1991 | Müller et al. . |
| 5,030,493 | 7/1991 | Rich . |
| 5,044,405 | 9/1991 | Driver et al. . |
| 5,044,824 | 9/1991 | Long, Jr. et al. . |
| 5,049,003 | 9/1991 | Barton . |
| 5,068,940 | 12/1991 | Sheppard et al. . |
| 5,077,107 | 12/1991 | Kandeda et al. . |
| 5,099,911 | 3/1992 | Vowles . |
| 5,104,595 | 4/1992 | Hunter . |
| 5,106,440 | 4/1992 | Tangeman . |
| 5,108,533 | 4/1992 | Long, Jr. et al. . |
| 5,122,193 | 6/1992 | Derlein . |
| 5,150,989 | 9/1992 | Long, Jr. et al. . |
| 5,154,936 | 10/1992 | Driver et al. . |
| 5,163,481 | 11/1992 | Catallo . |
| 5,172,730 | 12/1992 | Driver . |
| 5,186,215 | 2/1993 | Gilleland . |
| 5,213,727 | 5/1993 | Gargiulo . |
| 5,225,121 | 7/1993 | Yokoshima . |
| 5,230,842 | 7/1993 | Munde . |
| 5,241,993 | 9/1993 | Stephens . |
| 5,246,641 | 9/1993 | Perkins et al. . |
| 5,263,520 | 11/1993 | Arai ................................ 141/65 |
| 5,265,648 | 11/1993 | Lyon . |
| 5,265,671 | 11/1993 | Vowles . |
| 5,265,981 | 11/1993 | McNeil . |
| 5,271,433 | 12/1993 | Schwert et al. . |
| 5,280,811 | 1/1994 | Catallo et al. . |
| 5,286,144 | 2/1994 | Griner . |
| 5,307,608 | 5/1994 | Muir et al. . |
| 5,309,947 | 5/1994 | Hinger . |
| 5,322,653 | 6/1994 | Müller . |
| 5,329,063 | 7/1994 | Endoh . |
| 5,340,524 | 8/1994 | McMillan et al. . |
| 5,374,174 | 12/1994 | Long, Jr. . |

| | | |
|---|---|---|
| 5,397,513 | 3/1995 | Steketee, Jr. . |
| 5,409,561 | 4/1995 | Wood . |

FOREIGN PATENT DOCUMENTS

| | | |
|---|---|---|
| 1 271 115 | 7/1990 | Canada . |
| 2 204 027 | 8/1990 | Canada . |
| 117247 | 8/1984 | European Pat. Off. ................. 141/65 |
| 0 155 406 | 9/1985 | European Pat. Off. . |
| 0 056 140 | 2/1987 | European Pat. Off. . |
| 0 275 060 | 7/1988 | European Pat. Off. . |
| 0 275 924 | 7/1988 | European Pat. Off. . |
| 0 168 053 | 8/1989 | European Pat. Off. . |
| 0 391 270 | 10/1990 | European Pat. Off. . |
| 1150981 | 5/1956 | France . |
| 2 579 294 | 9/1986 | France . |
| 99 643 | 9/1972 | Germany . |
| 28 10 991 A1 | 9/1978 | Germany . |
| 2855906 | 7/1980 | Germany ................ 239/437 |
| 36 14963 C2 | 10/1987 | Germany . |
| 36 27 556 A1 | 2/1988 | Germany . |
| 39 10 607 A1 | 4/1990 | Germany . |
| 39 31 775 A1 | 4/1991 | Germany . |
| 40 31 741 A1 | 6/1991 | Germany . |
| 58-208014 | 12/1983 | Japan . |
| 63-5921 | 1/1988 | Japan . |
| 29831 | 6/1919 | Norway . |
| 635096 | 4/1950 | United Kingdom . |
| 989870 | 4/1965 | United Kingdom . |
| 1039836 | 8/1966 | United Kingdom . |
| 1 449 455 | 12/1972 | United Kingdom . |
| 1 340 068 | 12/1973 | United Kingdom . |
| 1 357 355 | 6/1974 | United Kingdom . |
| 1 423 819 | 2/1976 | United Kingdom . |
| 2 133 497 | 7/1984 | United Kingdom . |
| 2 218 773 | 11/1989 | United Kingdom . |
| WO 83/03131 | 9/1983 | WIPO . |

APPARATUS FOR VACUUM IMPREGNATION OF A FLEXIBLE, HOLLOW TUBE

BACKGROUND OF THE INVENTION

1. Field of the Invention

This invention relates to an apparatus and method for removing air from a tube to improve the impregnation of the tube with a curable resin or other viscous fluid used in cured-in-place pipe rehabilitation. The invention is further directed to a perforated hollow needle for use in vacuum impregnation. In a particular embodiment, the invention is directed to a method of evacuating air from a flexible, hollow tube, particularly a lining tube used for rehabilitation of underground conduits.

2. Description Of The Related Art

The present invention constitutes an improvement over prior methods and apparatus for removing air from a tube to improve the impregnation of the tube with a resin or other viscous fluid used in cured-in-place pipe rehabilitation.

Prior methods and apparatus used single and multiple cups to draw a vacuum through a window or slit cut in the tube. Other methods and apparatus involved the use of needles thereby eliminating the need for pre-cutting the tube by creating the opening upon insertion of the needle. Such prior needles had a single opening in the end through which air was drawn.

These prior systems were limited in the manner in which one could use them to withdraw air from tubes. For example, these prior systems did not provide a simple way to select the location or locations within the tube for the withdrawal of air from the tube. Further, these prior systems did not provide a way to adjust the rate or intensity of withdrawal of air from a particular portion of the tube. The present invention may overcome one or more of any shortcomings that may be present in the prior systems.

SUMMARY OF THE INVENTION

The present invention is directed generally to an apparatus and method for vacuum impregnation of a flexible, hollow tube. The apparatus includes a device for removing air from a tube, comprising a hollow tubular member having sidewalls defining an inner chamber and at least one aperture in the sidewalls to provide for the passage of air to the inner chamber through the aperture. The apparatus may additionally comprise a vacuum source, operably connected to the hollow tubular member to draw air through the aperture.

In another aspect, the invention is directed to a method for removing air from a flexible, hollow tube. The method broadly comprises inserting a suction apparatus into a tube, the suction apparatus comprising a needle having a sidewall with at least one aperture in the sidewall, and drawing air from the tube. The method may additionally include varying at least one location along the tubular member through which air may be drawn.

Advantageously, a specific embodiment of the invention provides for evacuation of a localized portion of the liner layers of the tube being impregnated with fluid. Accordingly, one may select and/or determine before or after placing the device within the tube being impregnated which portion or portions of the liner layers of the tube being impregnated will be evacuated. However, one may select such portion or portions while the device is in place, thus enabling one to provide a more localized and concentrated vacuum.

BRIEF DESCRIPTION OF THE DRAWINGS

The drawings, briefly described below, show various specific embodiments of the invention.

DETAILED DESCRIPTION OF THE INVENTION

Figure 1:
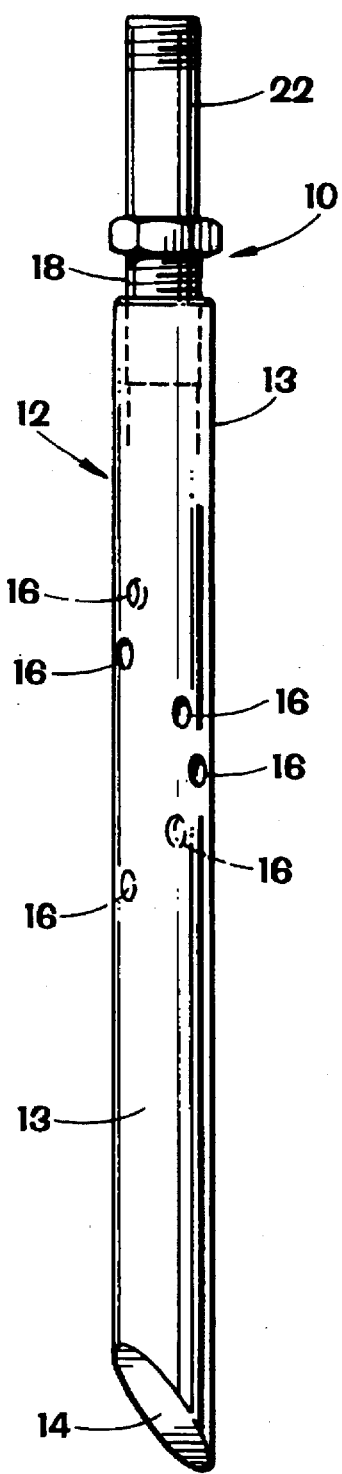
FIG. 1 is a perspective view of a vacuum impregnation device.
Figure 2:
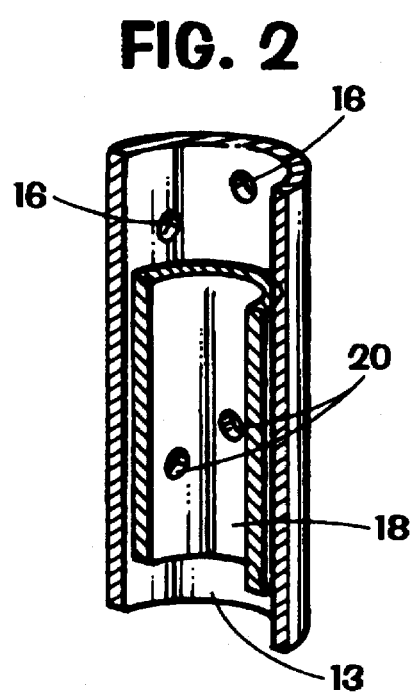
FIG. 2 is a partial, cross-section view of an outer tubular member and an inner tubular member of a specific embodiment of the present invention.

In a broad aspect, the present invention is directed to an improved method and apparatus for removing air from a tube. The method may be carried out in connection with the apparatus, and/or the method may be carried out in connection with other apparatus. Likewise, the apparatus may be utilized in connection with the method or the apparatus may be utilized in connection with other methods. Various embodiments and aspects of the apparatus are shown in FIGS. 1-6, where like reference numerals refer to like parts.

The method of this invention includes the step of inserting a suction apparatus into a tube, the suction apparatus comprising a needle having a sidewall with at least one aperture in the sidewall. The aperture may be any type of opening, including a perforation, window, slit, slot, hole, or any means by which air can be withdrawn from the tube. It should also be noted that the term "needle" as used herein refers to a generally elongated member having a chamber through which air may be withdrawn. Accordingly, the needle may be any size, shape or configuration, and is defined similar to the term tubular member, as defined elsewhere in this specification.

A specific embodiment of the method may include the step of depositing fluid, preferably a curable resin, within the tube and providing a force to the fluid, thereby causing the fluid to be deposited within the tube. The force may be applied directly to the fluid such as by means of a piston or plate directly in contact with the fluid, indirectly by elevating the fluid such that a gravitational force will act upon the fluid, by providing rolling means to the tube, or by any other means or combination of means which would cause the fluid to flow through the tube. It should be noted that the fluid can be any viscous substance capable of impregnating the body of the tube.

A specific embodiment of the method may include the step of selecting a location along the needle for withdrawing air from the tube. This selection may further comprise the step of moving an inner tubular member having an inner aperture within an outer tubular member having an outer aperture whereby the inner and outer apertures are substantially aligned. Advantageously, the aligned apertures may comprise a location for withdrawing air from a tube.

The apparatus in a broad aspect includes a vacuum device for removing air from a tube, comprising a hollow tubular member having sidewalls defining an inner chamber and at least one aperture in the sidewalls to provide for the passage of air to the inner chamber through the aperture. In a specific embodiment, the apparatus may include a vacuum source, operably connected to the hollow tubular member to draw air through the aperture.

In another embodiment, the hollow tubular member may have at least one aperture, preferably on a sidewall of the tubular member, whereby the position of the aperture within a tube can be placed or selected in such a way that air may be removed from a particular portion of the tube.

In yet another embodiment of the invention, the hollow tubular member may be an outer tubular member having at least one outer aperture, the vacuum device further comprising an inner tubular member having a sidewall with at least one inner aperture. The inner tubular member may be disposed for movement within the outer tubular member. The inner tubular member may also be slidable and/or rotatable with respect to the outer tubular member. In still another embodiment of the invention, at least one inner aperture may be substantially aligned with at least one outer aperture and the tubular member may be open-ended, closed-ended, and/or pointed.

Figure 3:
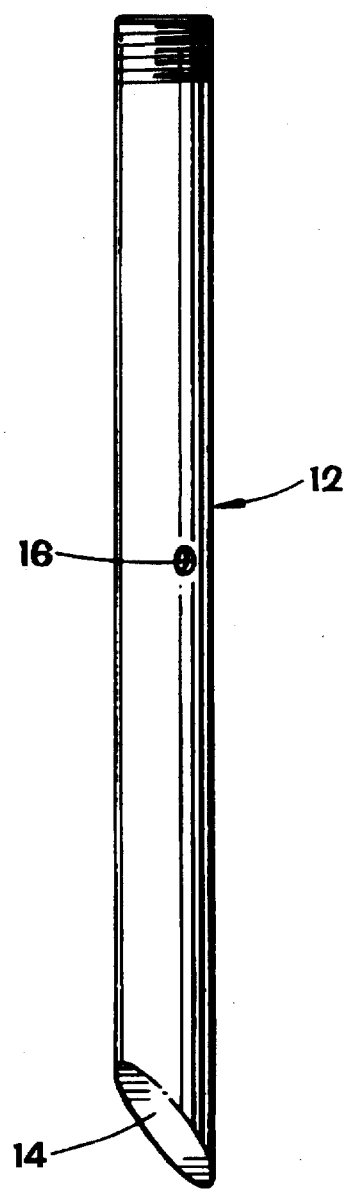
FIG. 3 is a perspective view of a hollow tubular member of the present invention.
Figure 4:
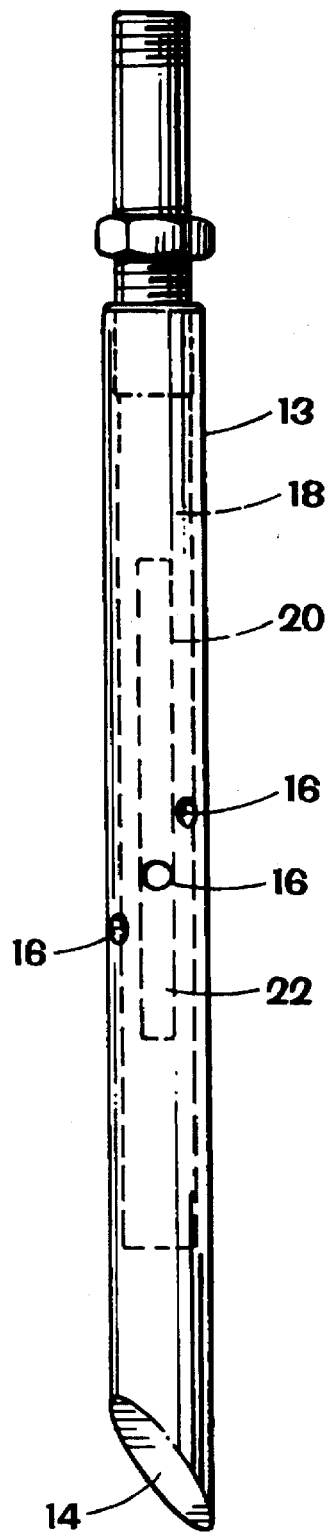
FIG. 4 is a perspective view of a vacuum impregnation device, showing an alternative embodiment of the present invention.
Figure 5:
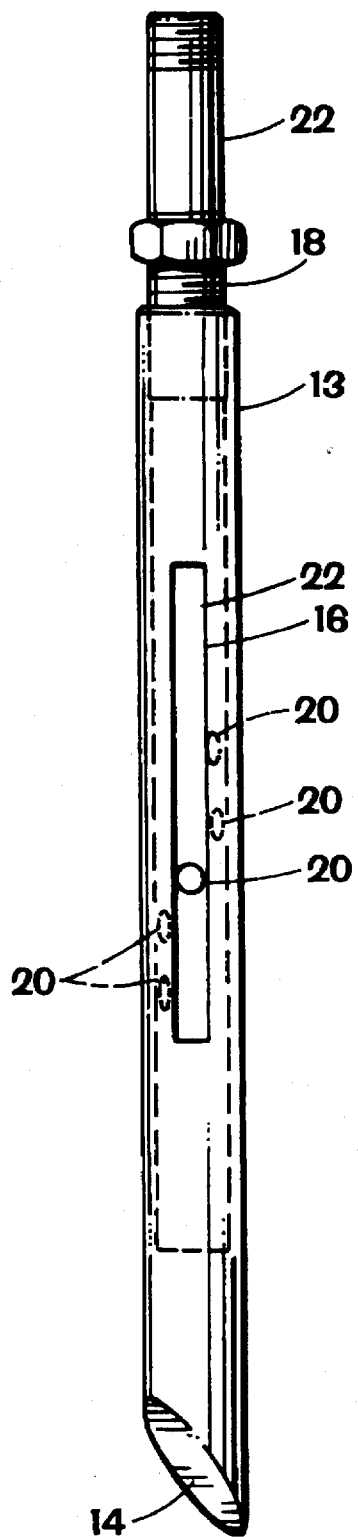
FIG. 5 is a perspective view of a vacuum impregnation device, showing another alternative embodiment of the present invention.

Referring now to the drawings, in FIG. 1, a specific embodiment of the invention includes a vacuum device or suction apparatus 10 which has a hollow tubular member 12, having a pointed tapered tip 14 and at least one aperture 16 in the sidewall of member 12. It should be apparent to one of ordinary skill in the art, that any type of hollow tubular member may be utilized in the vacuum impregnation device. It should be noted that the hollow tubular member may be one-piece in design or may be constructed of any number of pieces, members or segments. Further, the hollow tubular member need not be cylindrical and other tubular shapes may be utilized. For example, the hollow tubular member may be octagonal or ellipsoidal in cross-section and various cross-sections along the length of the member may have different shapes. Further, "vacuum" is defined herein as any pressure less than the pressure of the atmosphere surrounding the exterior surface of the tube. Thus, for example, creating a vacuum, meaning providing a sub-atmospheric pressure, is different than drawing a vacuum, which refers to the removal of air, which may result in either creating or maintaining a vacuum An embodiment of the invention includes multiple apertures 16 arranged at different lengthwise positions on member 12. However, as shown in FIG. 3, a single aperture 16 may also be utilized. Further, referring to FIG. 2, it should be noted that any shape or configuration of aperture 16, 20 may be utilized and the apertures in a particular embodiment may have more than one shape. For example, as shown in FIGS. 4 and 5, the aperture may be a slot 22 in either the inner tubular member 18 or the outer tubular member 13. Further, the shapes and sizes of the apertures 20 may be selected which in turn may provide for a desired level of concentration and localization of the vacuum within an absorbent layer of a lining tube, depending on the thickness, composition, density and/or number of layers making up a lining tube.

In a specific embodiment of the invention, the hollow tubular member 12 includes multiple aperture 16 arranged at different points lengthwise and circumferentially. For example, the apertures 16 may be arranged as shown in FIG. 1. In a specific embodiment, the vacuum impregnation device includes an inner tubular member 18 with inner apertures 20, and an outer tubular member 13 with outer apertures 16. However, as shown in FIG. 3, the vacuum device 10 may also include a single hollow tubular member 12 with either an open end 14 or a closed end 14.

In the embodiments shown in FIGS. 1, 2, 4, 5, and 6, the inner tubular member 18 is aligned with the outer tubular member 12 such that only one of the apertures 20 in the inner tubular member 18 is aligned with one of the apertures 16 of the outer tubular member 13 at a given time. However, in another embodiment, the alignment may be such that more than one set of apertures may be in alignment so that multiple points of evacuation may be provided.

Figure 6:
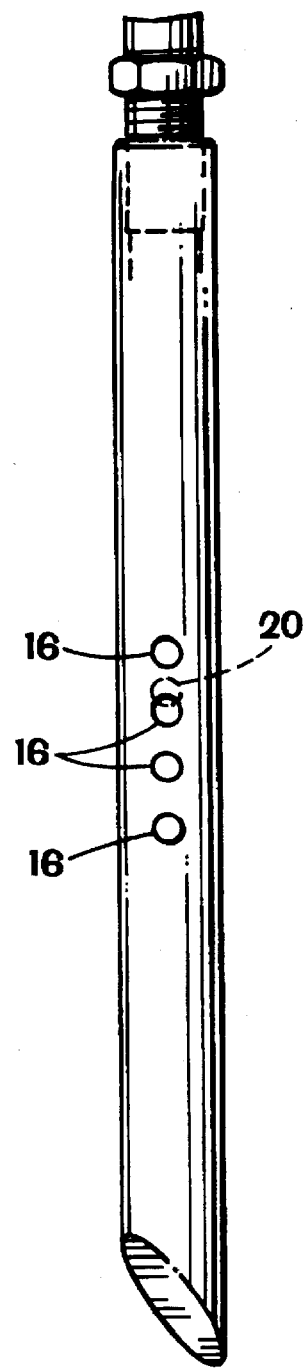
FIG. 6 is a perspective view of a vacuum impregnation device, showing yet another alternative embodiment of the present invention.

The inner tubular member 18 is preferably disposed for rotatable movement within the outer tubular member 13, being rotatable by mining the upper portion 22 of the inner tubular member 18. However, in another embodiment, as shown in FIG. 6, the inner tubular member 18 may also be disposed for slidable movement within the outer tubular member 13.

As shown in FIGS. 1, 2, 4, and 5, in a specific embodiment one may select which set of apertures 16, 20 will draw air from the tube by rotating the inner tubular member 18 so that at least one inner aperture 20 and at least one outer aperture 16 are aligned. Such ability to select which apertures are open enables one to determine the point or points at which air may be drawn, thereby localizing the point and/or points at which air may be drawn and/or concentrating the vacuum pressure at such point or points. It should be noted that the tube may be constructed of any number of materials, including, but not limited to, a liner having single or multiple layers of felt. Air may be drawn from within the chamber of the tube. Further, in the embodiment having a permeable liner made of felt, the air may also be drawn from the interstices or pores of the felt. Similarly, when other materials are used, air may also be drawn from the interstices or pores of such material. Therefore, precise control of the location from which air may be drawn may be important.

In a preferred embodiment of the invention, the vacuum impregnation device 10 may be used in drawing a vacuum from a multi-layered liner, preferably a liner used in the repair or rehabilitation of conduits such as sewer pipes. Many of these liners have one or more absorbent layers, particularly felt, which may be impregnated by a viscous fluid such as curable resin. In order to create a vacuum, or otherwise to evacuate a localized portion of one or more of the liner layers, a specific embodiment of the invention, shown in FIGS. 1, 2, 4, and 5, may be utilized by rotating the inner tubular member 18 to align apertures 16, 20 at selected distances from the tip of the needle, thus localizing the point and/or points at which air may be drawn and/or concentrating the vacuum pressure at such point or points.

It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims.

What is claimed is:

1. A vacuum device for removing air from a flexible tube that is to be used to line a conduit and to be impregnated with fluid, comprising:
   an outer tubular member having at least two outer apertures and an inner tubular member having at least one inner aperture, said inner tubular member disposed for movement within the outer tubular member so that the at least one inner aperture can be aligned with one outer aperture of the at least two outer apertures so as to provide one set of aligned apertures which forms a point of evacuation or with another outer aperture of the at least two outer apertures so as to provide another set of aligned apertures which forms another point of evacuation, said device also having a pointed end such that the device can be inserted into the flexible tube, said device also having a vacuum source operably connected to the inner tubular member for drawing air through the aligned apertures of a set so that air can be removed from the flexible tube, wherein at least one set of aligned apertures can be selected by moving the inner tubular member with respect to the outer tubular member, thereby controlling location of the point of evacuation.

2. The vacuum device of claim 1, wherein the inner tubular member is disposed for slidable movement within the outer tubular member.

3. The vacuum device of claim 2, wherein the outer tubular member is closed-ended and pointed.

4. The vacuum device of claim 2, wherein the outer tubular member is open-ended and pointed.

5. The vacuum device of claim 1, wherein the inner tubular member is disposed for rotatable movement within the outer tubular member.

6. The vacuum device of claim 5, wherein the outer tubular member is closed-ended and pointed.

7. The vacuum device of claim 5, wherein the outer tubular member is open-ended and pointed.

8. A vacuum device for removing air from a flexible tube that is to be used to line a conduit and to be impregnated with fluid, comprising: an outer tubular member having at least one outer aperture and an inner tubular member having at least two inner apertures, said inner tubular member disposed for movement within the outer tubular member so that the at least one outer aperture can be aligned with one inner aperture of the at least two inner apertures so as to provide a set of aligned apertures which forms a point of evacuation or with another inner aperture of the at least two inner apertures so as to provide another set of aligned apertures which forms another point of evacuation, said device also having a pointed end such that the device can be inserted into the flexible tube, said device also having a vacuum source operably connected to the inner tubular member for drawing air through the aligned apertures of a set so that air can be removed from the flexible tube, wherein at least one set aligned apertures can be selected by moving the inner tubular member with respect to the outer tubular member, thereby controlling location of the point of evacuation.

9. A vacuum device, for removing air from a tube used to line a conduit, comprising:
   a vacuum source and a hollow pointed needle disposed in operable communication with the vacuum source,
   said needle comprising:
      an outer tubular member, the outer tubular member having a sidewall and a pointed end, the sidewall of the outer tubular member having a plurality of outer apertures spaced lengthwise and circumferentially; and
      an inner tubular member, the inner tubular member having a sidewall, the sidewall of the inner tubular member having a plurality of inner apertures which are spaced lengthwise and circumferentially, the inner tubular member disposed for rotatable movement within the outer tubular member so as to provide at least two sets of aligned apertures, each set of aligned apertures including one of the inner apertures and one of the outer apertures and forming a point of evacuation,
   wherein one set of the at least two sets of aligned apertures can be selected by rotating the inner tubular member with respect to the outer tubular member, thereby controlling location of the point of evacuation.

* * * * *